United States Patent
Miyakozawa et al.

(10) Patent No.: US 7,252,172 B2
(45) Date of Patent: Aug. 7, 2007

(54) SADDLE-RIDE TYPE VEHICLE

(75) Inventors: Oki Miyakozawa, Shizuoka (JP); Mitsuru Sakamoto, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 335 days.

(21) Appl. No.: 10/964,935

(22) Filed: Oct. 14, 2004

(65) Prior Publication Data

US 2005/0082104 A1  Apr. 21, 2005

(30) Foreign Application Priority Data

Oct. 16, 2003  (JP) .............................. 2003-356919
Aug. 6, 2004  (JP) .............................. 2004-230366

(51) Int. Cl.
*B60K 1/00* (2006.01)

(52) U.S. Cl. ...................... 180/291; 180/296; 180/219; 180/68.2; 180/68.3

(58) Field of Classification Search ............... 180/68.2, 180/68.3, 219, 231, 291, 296
See application file for complete search history.

(56) References Cited

U.S. PATENT DOCUMENTS 4,757,872 A * 7/1988 Inomata ...................... 180/291
6,695,089 B2 * 2/2004 Adachi et al. .............. 180/311

FOREIGN PATENT DOCUMENTS

JP            60-58072       12/1985

* cited by examiner

*Primary Examiner*—Christopher P. Ellis
*Assistant Examiner*—Katy Meyer
(74) *Attorney, Agent, or Firm*—Hogan & Hartson LLP

(57) ABSTRACT

A saddle-ride type vehicle includes a body frame, an engine arranged in a forward manner of a rear cushion, and an air cleaner connected to the engine through an intake passage. The air cleaner is arranged in a rearward manner of a connection of an upper end of the rear cushion and the body frame, and the connection is arranged substantially just below the intake passage.

20 Claims, 5 Drawing Sheets

[Fig. 1]
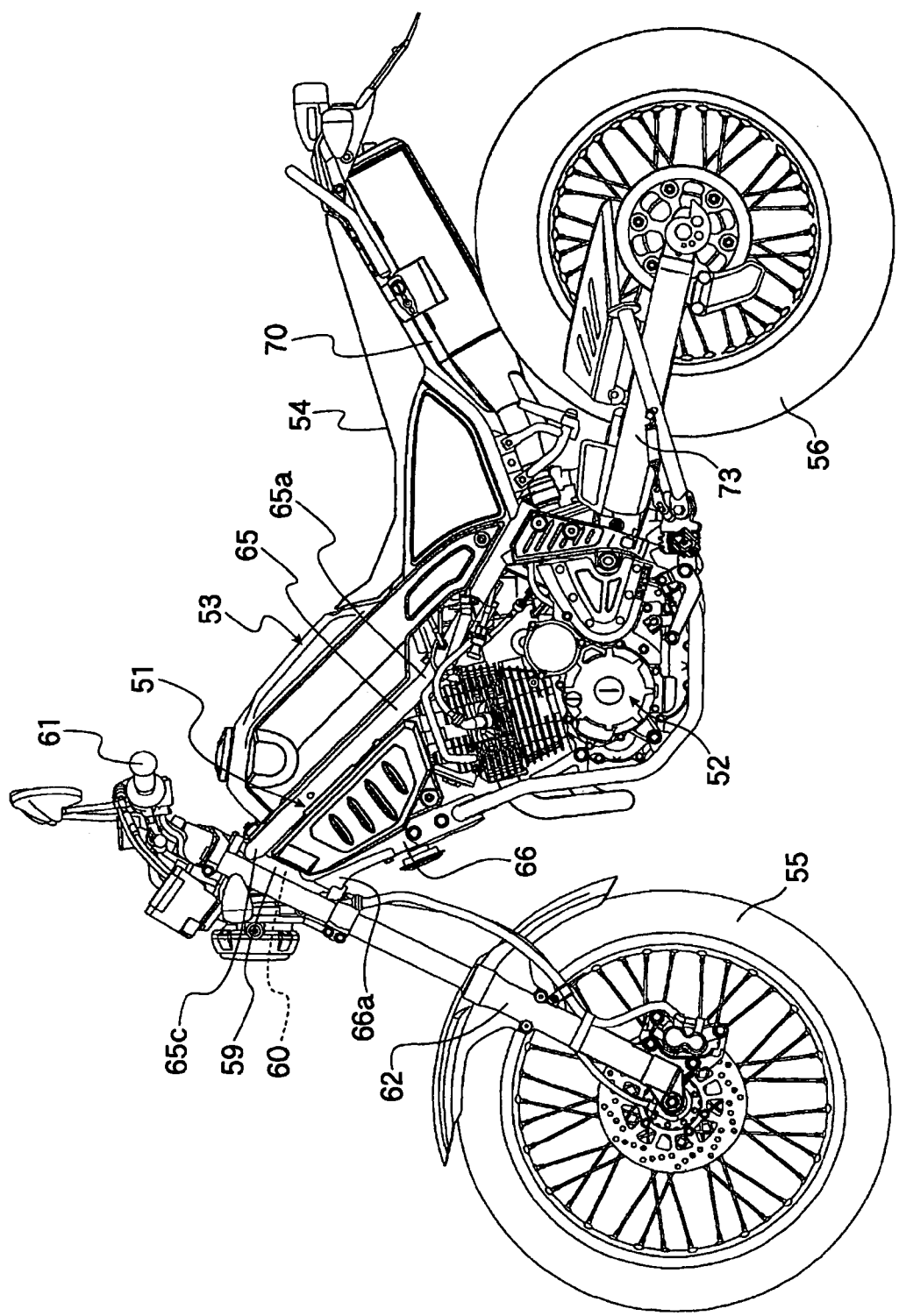

[Fig. 2]
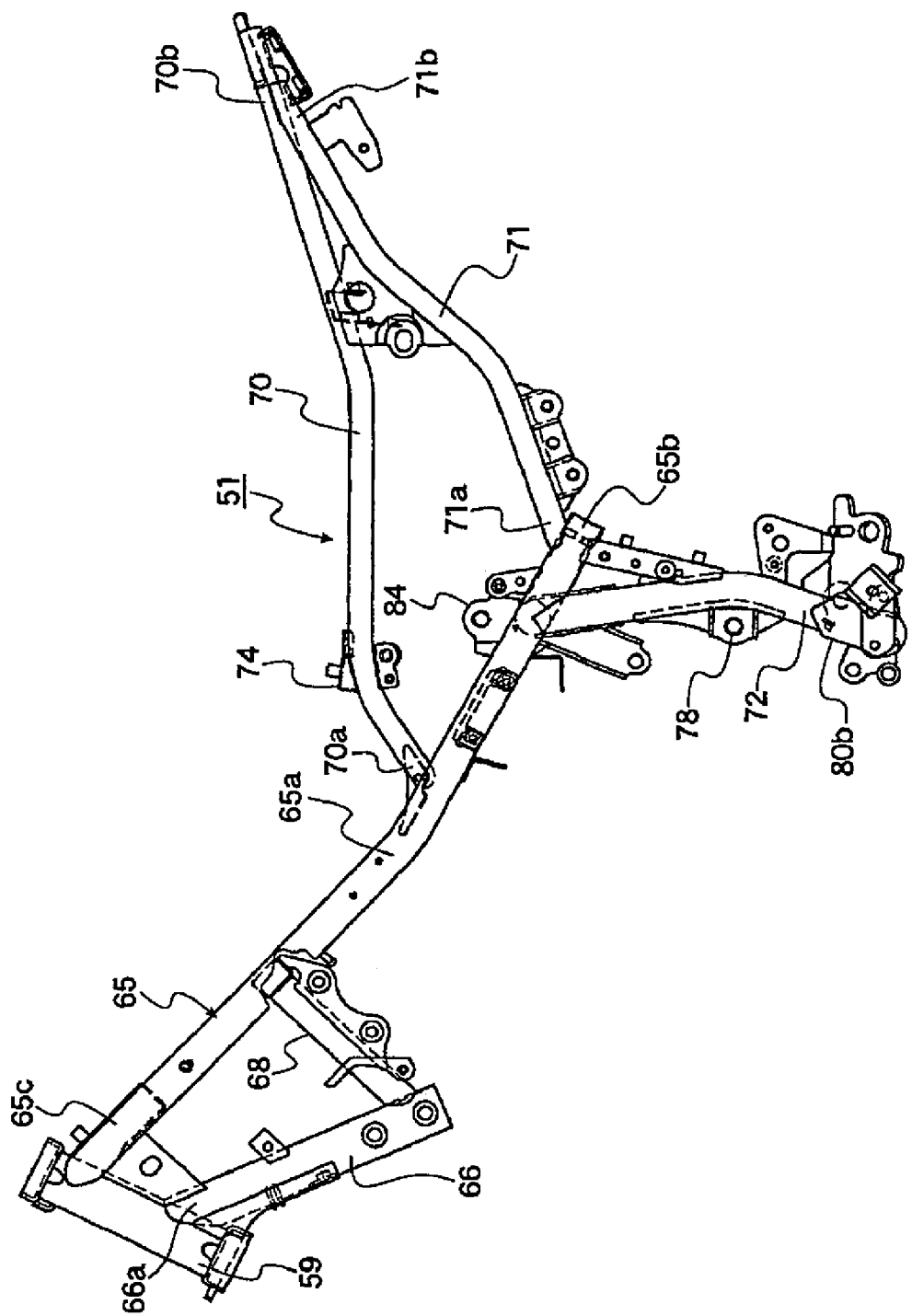

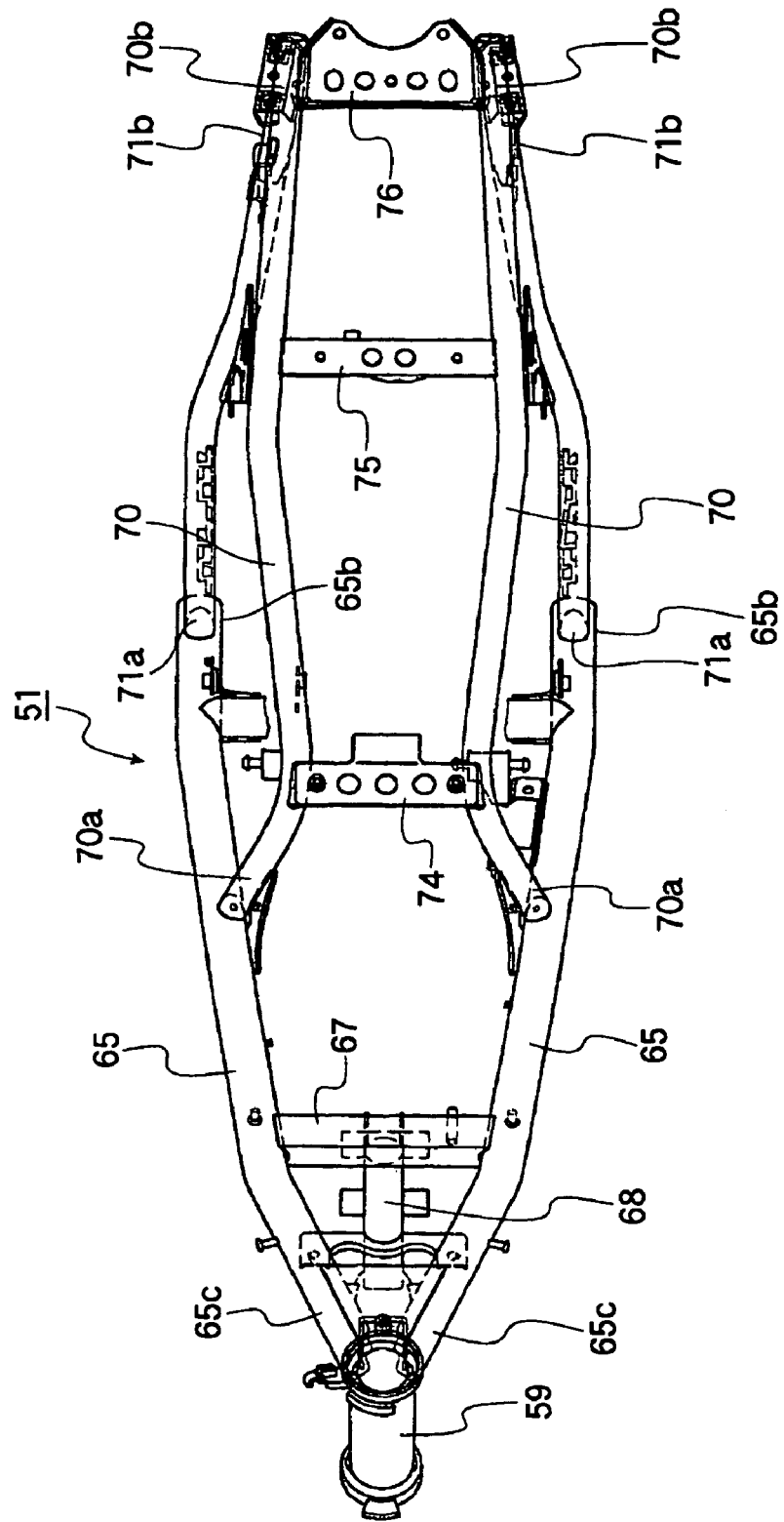
[Fig. 3]

[Fig. 4]
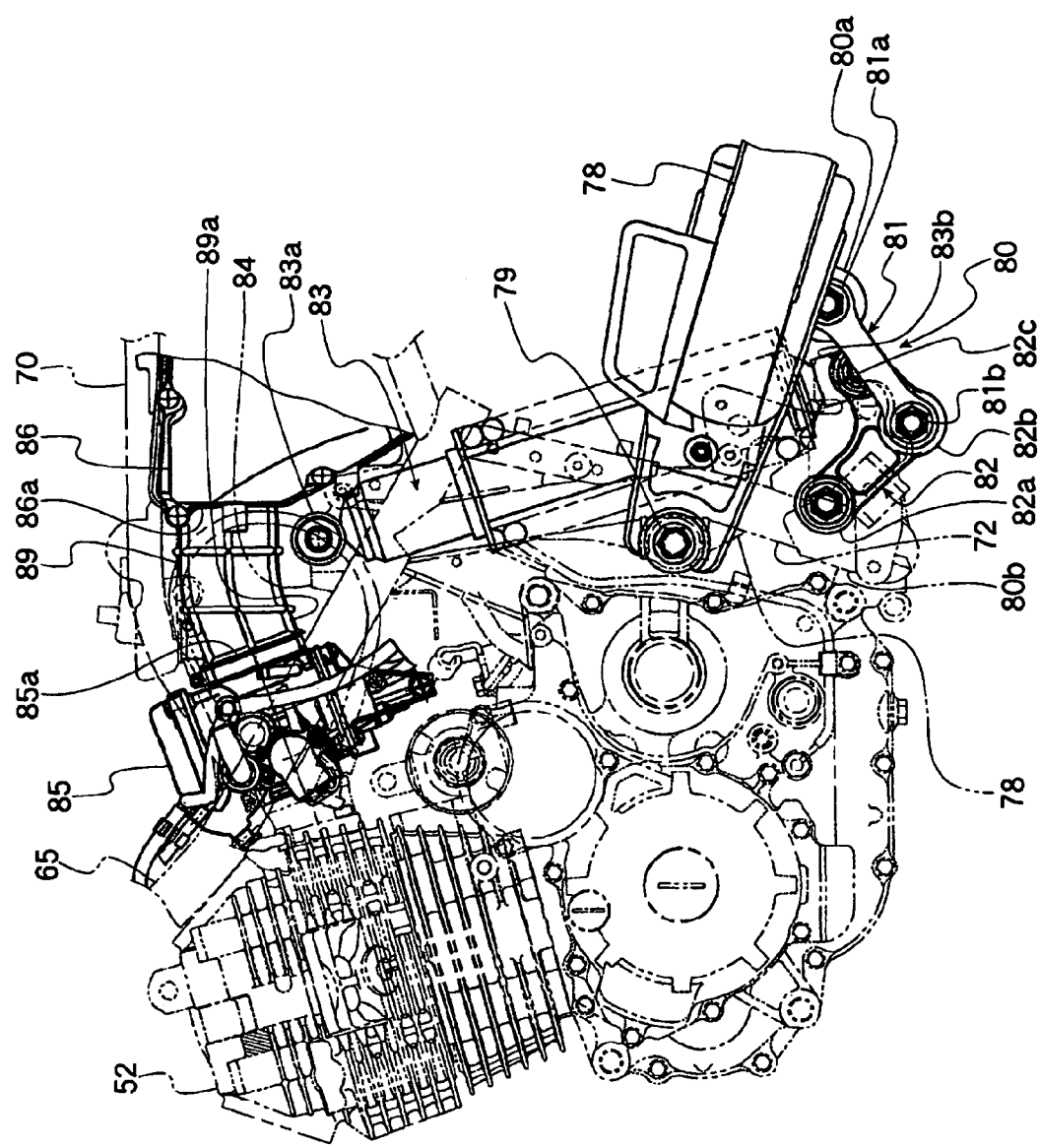

[Fig. 5]
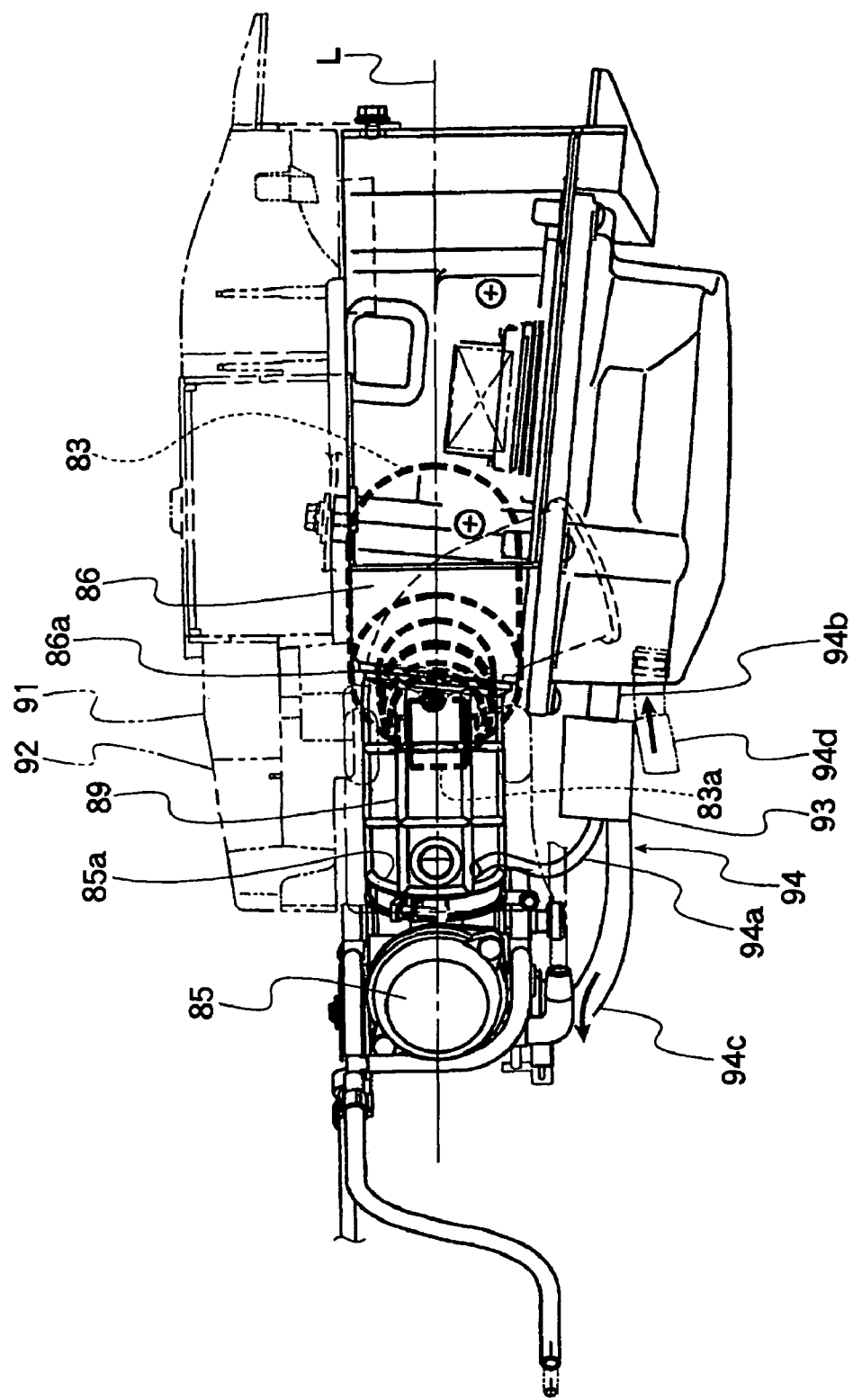

SADDLE-RIDE TYPE VEHICLE

BACKGROUND OF THE INVENTION

1. Field of the Invention

This invention relates to an improvement in construction, in which equipment such as an air cleaner, a carburetor, etc. are arranged around a rear cushion of a saddle-ride type vehicle.

2. Description of Related Art

Conventionally, a motorcycle such as a saddle-ride type vehicle is known, in which a body frame mounting thereon an engine is pivotally connected through a pivot shaft to rear arms mounting thereto a rear wheel. The rear arms and the body frame are connected to each other by a rear cushion. The rear cushion is arranged between the engine and the rear wheel.

As for the motorcycle, various types of equipment including intake system equipment such as an air cleaner, a carburetor, an intake passage connecting between them, etc. and electrical equipment such as a battery, etc. are arranged in a space defined between the engine below a seat member and the rear wheel and the rear cushion is arranged therein.

With such a conventional motorcycle, however, a rear cushion is set in a position, orientation, and the like, in which a predetermined action is performed, and arranged in the vicinity of and rearwardly of an engine, so that a space between the engine and the rear cushion is liable to become narrow. In order to arrange an air cleaner so as not to interfere with the rear cushion, the air cleaner must be arranged rearwardly of the rear cushion.

Therefore, an intake passage connected between the air cleaner and a carburetor must bypass the rear cushion, so that the intake passage is arranged laterally of the rear cushion to be liable to make it difficult to arrange other equipment. Also, in order to arrange other equipment, the work of mounting equipment, such as the fixation of the intake passage by the use of a binding band, takes time. Consequently, a problem arises that a lot of restrictions are involved in the arrangement of equipment around the rear cushion which makes the layout complex. Thus, it is difficult to achieve making effective use of the space.

Hereupon, it is an advantage of the invention to provide a saddle-ride type vehicle capable of more simply constructing the layout of the rear cushion and the intake passage and readily making effective use of the space defined between the engine and the rear wheel.

SUMMARY OF THE INVENTION

According to an embodiment of the present invention, a feature in a saddle-ride type vehicle, in which rear arms are pivotally mounted through a pivot shaft to a body frame, includes a rear cushion connected between the rear arms and the body frame to be arranged substantially vertically, an engine is arranged forwardly of the rear cushion, and an air cleaner arranged rearward is connected to the engine through an intake passage. The air cleaner is arranged rearwardly of a connection of an upper end of the rear cushion and the body frame and the connection is arranged substantially just below the intake passage.

An exhaust port of the air cleaner and the intake passage are positioned on a center line of the vehicle body as viewed in plan view of the vehicle body. The connection is arranged substantially just below the intake passage.

The intake passage connected between the exhaust port of the air cleaner and a side of the engine is arranged substantially horizontally.

A first link piece pivotally connected to the rear arms and a second link piece pivotally connected to the body frame are connected to each other. A lower end of the rear cushion is connected to the second link piece.

The saddle-ride type vehicle is a motorcycle for two on-off uses.

The connection is arranged in a recess formed by a throttle body lower portion, in which a throttle valve for opening and closing of the intake passage is accommodated, a lower portion of the air cleaner, and the intake passage.

A battery is arranged on one side of the intake passage, and a piping connected to the air cleaner is arranged on the other side of the intake passage.

The air cleaner is arranged in a rearward manner of a connection of an upper end of the rear cushion and the body frame. The connection is arranged substantially just below the intake passage, so that the intake passage can be arranged above the rear cushion and is required not to bypass the rear cushion, thus making it easy to arrange other equipment on the sides of the rear cushion. Therefore, the layout of the equipment around the rear cushion can be arranged in a further simple configuration, which readily makes effective use of the space between the engine and the rear wheel.

According to an embodiment of the present invention, an exhaust port of the air cleaner and the intake passage are positioned on a center line of the vehicle body as viewed in plan view of the vehicle body, and the connection is arranged substantially just below the intake passage, so that the respective equipment can be readily concentrated about the center of the vehicle body and arranged in a well-balanced manner. In particular, the rear cushion and its connection are arranged on the center of the vehicle body to readily improve balance in terms of strength widthwise of the vehicle body and readily make the body frame or the like lightweight.

The intake passage connected between the exhaust port of the air cleaner and a side of the engine is arranged substantially horizontally, so that the intake passage extending from the exhaust port of the air cleaner to the engine is made straight to make the flow of the intake air to the engine smooth to enhance the intake efficiency, thus enabling improving the engine in performance.

According to an embodiment of the present invention, a link mechanism connected between a first link piece pivotally connected to the rear arms and a second link piece pivotally connected to the body frame is provided, and a lower end of the rear cushion is connected to the second link piece, so that the rear cushion having a less magnitude of stroke can absorb up-and-down movements of the rear arms. It is possible to achieve making the rear cushion further compact and to readily arrange the rear cushion below the intake passage. Therefore, it is possible to arrange the rear cushion in a lower position in the vehicle to lower the center of gravity thereof.

It is unnecessary to bypass the rear cushion to arrange the intake passage laterally of the rear cushion and the saddle-ride type vehicle is readily formed to be small in breadth, so that a pronounced effect is produced when an embodiment of the present invention is applied to motorcycles for two on-off uses, in which a demand for reduction in breadth of a vehicle and enhancement in frame strength is made intensely.

The connection is arranged in a recess formed by a throttle body lower portion, in which a throttle valve for opening and closing of the intake passage is accommodated, a lower portion of the air cleaner, and the intake passage, so that it is possible to make effective use of the dead space, which is liable to be formed by the arrangement of the throttle body, the air cleaner and the intake passage.

A battery is arranged on one side of the intake passage, or a piping connected to the air cleaner is arranged on the other side of the intake passage, so that it is possible to arrange the equipment laterally of the rear cushion, thus enabling surely making effective use of the space.

BRIEF DESCRIPTION OF THE SEVERAL VIEWS OF THE DRAWINGS

FIG. 1 is a side view showing a motorcycle according to an embodiment of the present invention.

FIG. 2 is a side view showing a body frame according to an embodiment of the present invention.

FIG. 3 is a plan view showing the body frame according to an embodiment of the present invention.

FIG. 4 is a partial, side view showing the construction around a rear cushion in the motorcycle according to an embodiment of the present invention.

FIG. 5 is a partial, plan view showing the construction around the rear cushion in the motorcycle according to an embodiment of the present invention with partial parts removed.

DETAILED DESCRIPTION OF THE PREFERRED EMBODIMENTS

Embodiments of the invention will be described below.

FIGS. 1 to 5 show a saddle-ride type vehicle according to an embodiment of the present invention.

First, an explanation is given to the construction, and FIG. 1 shows a motorcycle as a "saddle-ride type vehicle", the motorcycle being one for so-called two on-off uses, capable of mainly traveling on irregular places such as unleveled ground or the like and designed to be narrow in breadth and lightweight as compared with motorcycles, which travel on an ordinary road, in view of the quality of handling a vehicle body at the time of traveling.

Concretely, reference numeral 51 in FIG. 1 denotes a body frame. An engine 52 is mounted on the body frame 51 and a fuel tank 53 is mounted above the engine 52. A seat 54 is mounted in a rearward manner of the fuel tank 53 and a front wheel 55 and a rear wheel 56 are arranged in a forward manner of and in a rearward manner of the body frame 51, respectively.

The body frame 51 is provided, as shown in FIGS. 2 and 3, at a forward end thereof with a cylindrical-shaped head pipe 59. A steering shaft 60 is rotatably supported on the head pipe 59. The steering shaft 60 mounts a handle 61 on an upper portion thereof and a pair of left and right front forks 62 on a lower portion thereof, and the front wheel 55 is born between the front forks 62.

Also, a pair of left and right main frames 65 are fixed at forward ends 65c thereof to the head pipe 59 to extend obliquely rearward and downward. A single down-tube 66 is arranged centrally below the main frames 65 with a forward end 66a fixed to the head pipe 59.

A horizontal cross member 67 is provided and arranged between the pair of left and right main frames 65, and a vertical cross member 68 is provided between the horizontal cross member 67 and the down-tube 66.

Intermediate portions 65a of the main frames 65 are slightly bent as shown in FIG. 2. The intermediate portions 65a fix thereto forward ends 70a of a pair of left and right seat frames 70 near to rearward portions thereof. The seat frames 70 extend obliquely rearward and upward.

Further, a pair of left and right reinforcement frames 71 are arranged below the seat frames 70. The reinforcement frames 71 are fixed at forward ends 71a thereof to rear ends 65b of the main frames 65 and extend obliquely rearward and upward, and rear ends 71b are fixed to the undersides of rear ends 70b of the seat frames 70.

Also, a plurality of cross members 74, 75, 76 are provided between the pair of left and right seat frames 70 as shown in FIG. 3.

Furthermore, support frames 72 are extended downward from forward and near portions of the rear ends 65b of the main frames 65.

Rear arm mounts 78 are provided at lower positions of the support frames 72 as shown in FIG. 4, and rear arms 73 are pivotally mounted by means of a pivot shaft 79 to support the rear wheel 56 in a vertically swingable manner.

According to the embodiment, a rear cushion 83 connects between the body frame 51 and the rear arms 73 as shown in FIGS. 4 and 5, and accessories such as an air cleaner or the like are arranged about the rear cushion.

In order that the rear cushion 83 connects between the body frame 51 and the rear arms 73, an upper end 83a of the rear cushion 83 is pivotally mounted to a cushion connection 84 of the main frames 65 while a lower end 83b of the rear cushion 83 is connected to the rear arms 73 through a link mechanism 80 formed between the body frame 51 and the rear arms 73.

The link mechanism 80 includes a link connection 80a provided in the vicinity of the pivot shaft 79 on the rear arms 73 forwardly of the rear wheel 56, and pivotally mounting thereto one end 81a of a first link piece 81. Also, a link connection 80b is provided on lower ends of the support frames 72 and pivotally connects thereto one end 82a of a substantially L-shaped second link piece 82. The other end 81b of the first link piece 81 and an intermediate portion 82b of the second link piece 82 are pivotally connected to each other to constitute the link mechanism 80, so that turning of the rear arms 73 causes the other end 82c of the second link piece 82 to move up and down. The rear cushion 83 is pivotally mounted and connected to the other end 82c of the second link piece 82.

The engine 52 is fixed to and arranged on the body frame 51 in a forward manner of the rear cushion 83 arranged thus substantially in a vertical manner as shown FIGS. 4 and 5, and a throttle body 85 accommodating therein a throttle valve for opening and closing of an intake passage 89 is mounted in a rearward manner of and in the vicinity of an upstream cylinder 52a of the engine 52. The intake passage 89 is connected to an intake port 85a of the throttle body 85, and the intake port 85a of the throttle body 85 is connected through the intake passage 89 to an exhaust port 86a of an air cleaner 86 arranged in a rearward manner of the upper end 83a of the rear cushion 83. In addition, the throttle body 85 may include either a throttle body used for fuel injection type engines or a carburetor.

The intake passage 89 is arranged above the rear cushion 83 in a manner to arrange the upper end 83a of the rear cushion 83 substantially just below. Here, since the exhaust port 86a of the air cleaner 86 and the intake port 85a of the throttle body 85 are arranged in substantially the same level, the intake passage 89 is arranged substantially in a horizontal manner. Simultaneously, the upper end 83a of the rear cushion 83 is arranged in a downward manner facing recess 89a formed by a lower portion of the throttle body 85, a lower portion of the air cleaner 86 and a lower end of the intake passage 89.

Also, as shown in FIG. 5, a center of the exhaust port 86a of the air cleaner 86, a center line of the intake passage 89, and a center of the intake port 85a of the throttle body 85 are positioned on a center line L of the vehicle body as viewed in plan view of the vehicle body. Therefore, intake air from the air cleaner 86 is supplied to the throttle body 85 in a linear flow.

Further, the cushion connection 84 of the body frame 51, to which the upper end 83a of the rear cushion 83 is connected, is arranged just below the intake passage 89, and the rear cushion 83 and the body frame 51 are disposed on substantially the center line L of the body frame 51. In addition, the cushion connection 84 is not necessarily arranged completely just below the intake passage 89 but it suffices that at least a part of the cushion connection 84 overlaps the intake passage 89 as viewed in plan view.

With such an arrangement of the construction, a battery 91 and an electrical equipment 92 connected to the battery 91 are arranged on one side of the intake passage 89, and an air assist device 93 and its piping 94 are arranged on the other side of the intake passage 89. Included in the piping 94 of the air assist device 93 are a pipe 94a for the detection of negative pressure, connected to an upstream side of a carburetor 85, a pipe 94b to supply to the air assist device 93 air from the air cleaner 86, a pipe 94c to supply air to an exhaust side of the engine, and a pipe 94d to supply to the air cleaner 86 gases leaking from a head-cylinder side of the engine 52.

By arranging the rear cushion 83 and the equipment therearound in the manner described above, the air cleaner 86 is arranged in a rearward manner of the upper end 83a of the rear cushion 83 connected to the body frame 51 and the cushion connection 84, to which the upper end 83 of the body frame 51 is connected, is arranged substantially just below the intake passage 89, so that the intake passage 89 can be arranged above the rear cushion 83 and so is not required to bypass the rear cushion 89 whereby various equipment can be readily arranged laterally of the rear cushion 83. Therefore, the layout of the equipment around the rear cushion 83 can be arranged in a further simple configuration, which readily makes effective use of the space between the engine 52 and the rear wheel 56.

Also, since the cushion connection 84 of the body frame 51, to which the upper end 83a of the rear cushion 83 is connected, is arranged in the recess 89a formed below the throttle body 85, the air cleaner 86 and the intake passage 89. It is possible to make effective use of the dead space, which is liable to be formed by the throttle body 85, the air cleaner 86 and the intake passage 89.

Further, since the battery 91 is arranged on one side of the intake passage 89, or the piping 94 connected to the air cleaner 86 is arranged on the other side of the intake passage 89, this equipment is arranged laterally of the rear cushion 83 to be able to surely achieve making effective use of the space.

Also, since the exhaust port 86a of the air cleaner 86 and the intake passage 89 are positioned on the center line L of the vehicle body as viewed in plan view of the vehicle body and the cushion connection 84 of the body frame 51, to which the upper end 83a of the rear cushion 83 is connected, is arranged substantially just below the intake passage 89, the respective equipment can be readily concentrated about the center line L of the vehicle body and arranged in a well-balanced manner. In particular, since the cushion connection 84 can be arranged on the center line L of the vehicle body, balance in terms of strength is readily improved widthwise of the vehicle body and the body frame 51 or the like is readily made lightweight.

Further, since the rear cushion 83 can be arranged in a lower position as by being arranged in a predetermined position on the body frame 51 and the rear arms 73 and by the use of the link mechanism, and the intake passage 89 connecting between the exhaust port 86a of the air cleaner 86 and the engine 52 is arranged substantially horizontally, the intake passage 89 extending from the exhaust port 86a of the air cleaner 86 to the engine 52 is made straight to make the flow of intake air to the engine 52 smooth to enhance the intake efficiency, thus enabling improving the engine 52 in performance.

Also, the link mechanism includes the first link piece 81 pivotally connected to the rear arms 73 and the second link piece 82 pivotally connected to the body frame 51, and the lower end 83b of the rear cushion 83 is connected to the second link piece 82, so that the rear cushion 83 having a less magnitude of stroke can absorb up-and-down movements of the rear arms 73. Therefore, it is possible to achieve making the rear cushion 83 compact and to readily arrange the rear cushion 83 below the intake passage 89. Consequently, it is possible to arrange the rear cushion 83 in a lower position in the vehicle to lower the center of gravity thereof.

Besides, since it is unnecessary to arrange the intake passage 89 bypassing the rear cushion 83 laterally thereof, the breadth of the vehicle can be narrowed, balance in terms of strength is readily improved, and a pronounced effect is produced in motorcycles for two on-off uses, in which such demand is intensely made.

While according to an embodiment of the present invention, the center of the exhaust port 86a of the air cleaner 86, the center line of the intake passage 89, and the center of the intake port 85a of the throttle body 85 are positioned on the center line L of the vehicle body as viewed in plan view of the vehicle body, the embodiment of the present invention is not limited thereto but it suffices that the exhaust port 86a of the air cleaner 86 and the intake passage 89 be positioned on the center line L of the vehicle body even when the center line L of the vehicle body shifts from the center of the exhaust port 86a of the air cleaner 86 and the center line of the intake passage 89.

What is claimed is:

1. A saddle-ride type vehicle, comprising:
   a body frame
   an engine arranged in a forward manner of a rear cushion; and
   an air cleaner connected to the engine through an intake passage,
   wherein the air cleaner is arranged in a rearward manner of a connection of an upper end of the rear cushion and the body frame, and the connection is arranged substantially just below the intake passage and overlaps the intake passage in a plan view.

2. The saddle-ride type vehicle according to claim 1, wherein an exhaust port of the air cleaner and the intake passage are positioned on a center line of the vehicle as viewed in plan view of the vehicle, and the connection is arranged substantially just below the intake passage.

3. The saddle-ride type vehicle according to claim 2, wherein the intake passage connected between the exhaust port of the air cleaner and a side of the engine is arranged substantially horizontally.

4. The saddle-ride type vehicle according to claim 1, wherein a first link piece pivotally connected to rear arms and a second link piece pivotally connected to the body frame are connected to each other, and a lower end of the rear cushion is connected to the second link piece.

5. The saddle-ride type vehicle according to claim 1, wherein the saddle-ride type vehicle is a motorcycle for two on-off uses.

6. The saddle-ride type vehicle according to claim 1, wherein the connection is arranged in a recess formed by a throttle body lower portion, in which a throttle valve for opening and closing of the intake passage is accommodated, a lower portion of the air cleaner, and the intake passage.

7. The saddle-ride type vehicle according to claim 1, wherein a battery is arranged on one side of the intake passage.

8. The saddle-ride type vehicle according to claim 4, wherein a piping connected to the air cleaner is arranged on another side of the intake passage.

9. The saddle-ride type vehicle according to claim 1, further comprising rear arms pivotally mounted through a pivot shaft of the body frame.

10. The saddle-ride type vehicle according to claim 9, wherein the rear cushion is connected between the rear arms and the body frame to be arranged substantially vertical.

11. A method for manufacturing a saddle-ride type vehicle, comprising:
arranging an engine in a forward manner of a rear cushion;
arranging an air cleaner which is connected to the engine through an intake passage;
arranging the air cleaner in a rearward manner of a connection of an upper end of the rear cushion and a body frame; and
arranging the connection substantially below the intake passage and overlapping the intake passage in a plan view.

12. The method for manufacturing a saddle-ride type vehicle according to claim 11, further comprising positioning a exhaust port of the air cleaner and the intake passage on a centerline of the vehicle as viewed in plan view of the vehicle and arranging the connection substantially just below the intake passage.

13. The method for manufacturing a saddle-ride type vehicle according to claim 12, further comprising arranging substantially horizontally the intake passage connected between the exhaust port of the air cleaner and a side of the engine.

14. The method for manufacturing a saddle-ride type vehicle according to claim 11, further comprising connecting a first link piece pivotally connected to rear arms and a second link piece pivotally connected to the body frame to each other, and connecting a lower end of the rear cushion to the second link piece.

15. The method for manufacturing a saddle-ride type vehicle according to claim 11, further comprising arranging the connection in a recess formed by a throttle body lower portion, in which a throttle valve for opening and closing of the intake passage is accommodated, a lower portion of the air cleaner, and the intake passage.

16. The method for manufacturing a saddle-ride type vehicle according to claim 11, further comprising arranging a battery on one side of the intake passage.

17. The method for manufacturing a saddle-ride type vehicle according to claim 16, further comprising arranging a piping connected to the air cleaner on the other side of the intake passage.

18. The method for manufacturing a saddle-ride type vehicle according to claim 11, further comprising pivotally mounting rear arms through a pivot shaft of the body frame.

19. The method for manufacturing a saddle-ride type vehicle according to claim 18, further comprising arranging the rear cushion connected between the rear arms and the body frame substantially vertical.

20. A saddle-ride type vehicle, comprising:
a body frame;
an engine arranged in a forward manner of a single rear cushion; and
an air cleaner connected to the engine through an intake passage,
wherein the air cleaner is arranged in a rearward manner of a connection of an upper end of the rear cushion and the body frame, and the connection is arranged substantially just below the intake passage,
and overlaps the intake passage in a plan view.

* * * * *